Nov. 19, 1963 T. O. MARINI ET AL 3,111,333
UTILITY CART CONSTRUCTED OF PREFORMED TUBULAR MEMBERS
Filed April 27, 1962 2 Sheets-Sheet 1
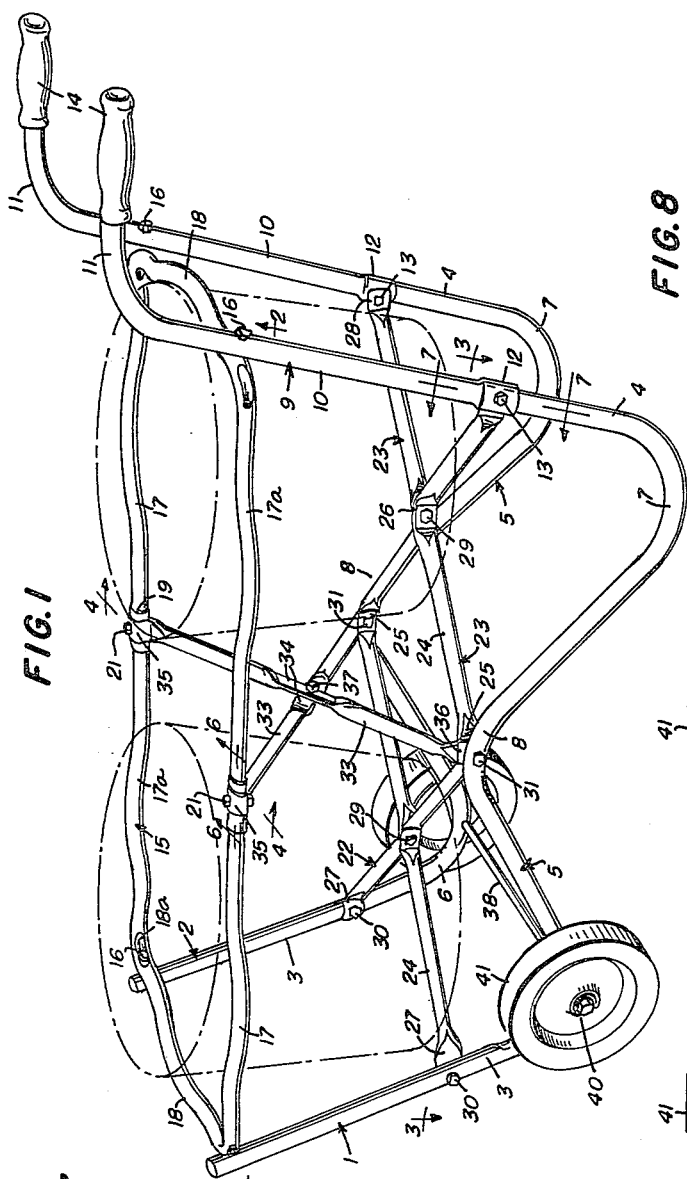
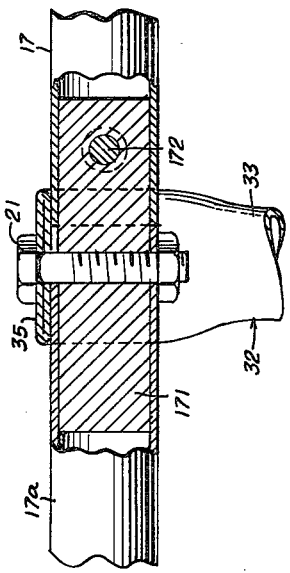
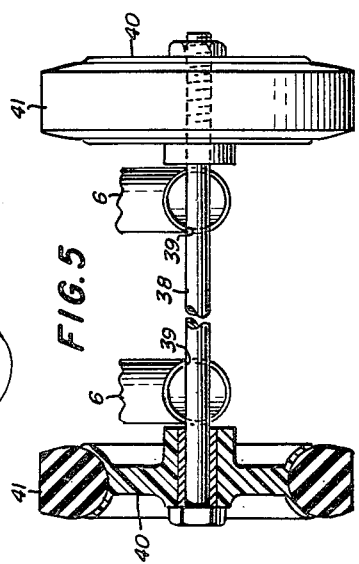
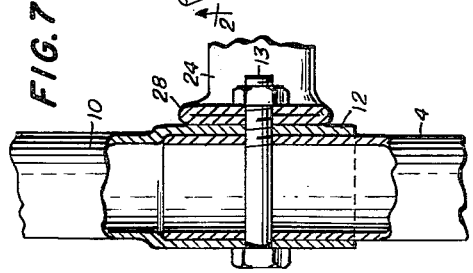
INVENTORS
*THOMAS O. MARINI*
*LOUIS G. MARINI*
BY
ATTORNEYS

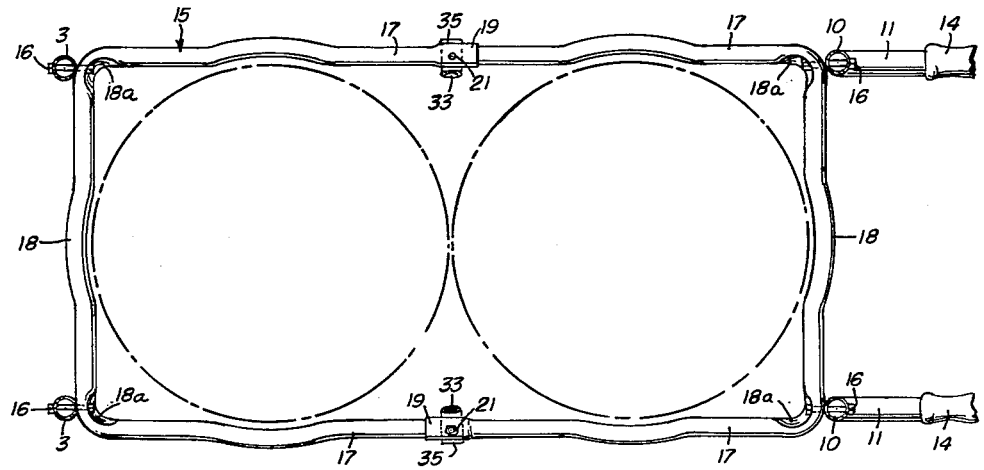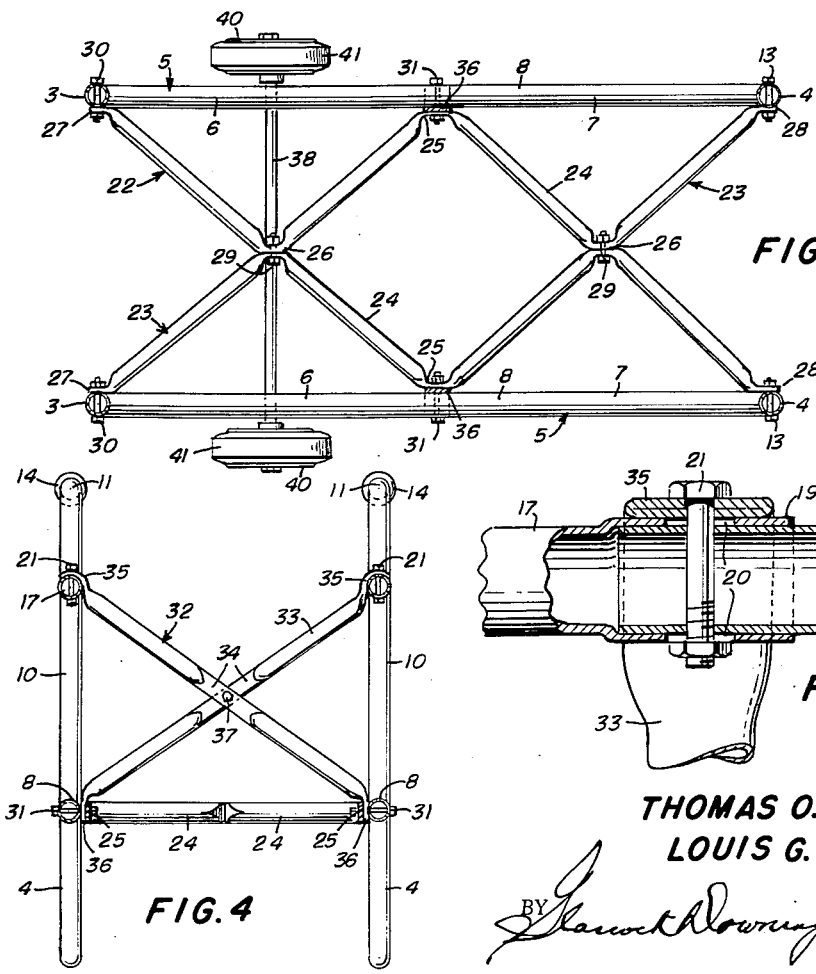

ID
3,111,333
UTILITY CART CONSTRUCTED OF PREFORMED
TUBULAR MEMBERS
Thomas O. Marini, 1500 Prospect Blvd., Haddon Heights, N.J., and Louis G. Marini, 316 Springhouse Lane, Moorestown, N.J.
Filed Apr. 27, 1962, Ser. No. 190,631
1 Claim. (Cl. 280—47.19)

This invention relates to a utility cart which is especially adapted for domestic use in the holding and transporting of garbage and trash pails and containers. Although the cart of the invention was especially designed for household use it is equally well adapted for use by apartment house janitors or caretakers and by the cleaning personnel of office and other public buildings.

The principal object of the invention is to provide a utility cart of the aforesaid character which is light weight but yet is strong and durable and is inexpensive to manufacture.

Another object of the invention is to provide a utility cart of the aforesaid character which is so designed and constructed that it can be packaged and sold in knockdown form, and can be quickly and easily assembled by a purchaser.

In order to attain the aforesaid objects the cart is made up of a plurality of pairs of similar preformed tubular elements which can be readily assembled together. The cart comprises a pair of vertically disposed laterally spaced similar side frames each of which consists of a longitudinally extending lower section having an upwardly extending arm at each end thereof. The longitudinal lower sections are formed with a pair of spaced downwardly extending bends or rounded protuberances, which are connected together by an upwardly extending medial hump or reversed bend. An elongated bolt, which constitutes an axle, extends through apertures in the bends at the forward end of the side frames and has wheels rotatably mounted on each end thereof outwardly of the side frames. The bends at the rear end of the side frames are of greater depth than the bends at the forward ends of the side frames and constitute supporting legs when the cart is at rest. The upwardly extending arms at the rear ends of the side frames are provided with a pair of similar, aligned extensions which terminate in rearwardly extending handle portions which are preferably provided with rubber grips.

The upper ends of the side frame arms are all bolted to a substantially horizontally disposed rectangular frame which consists of a pair of opposed, similar U-shaped members having the free ends thereof suitably connected together.

A utensil supporting base, which consists of a pair of similar zig-zag or V-shaped members secured together back-to-back, is secured to and between the side frames, parallel to the upper rectangular frame, at the apices of the upwardly extending medial connecting humps or reverse bends of the lower connecting members of the side frames.

A medial, transverse, dividing and rigidifying X-shaped frame which consists of a pair of similar diagonally disposed crossing members is detachably secured to and between the upper rectangular frame and the medial connecting upwardly extending humps or reverse bends of the side frames.

Having stated the principal objects of the invention other and more limited objects thereof will be apparent from the following specification and the accompanying drawings forming a part thereof in which:

FIGURE 1 is a perspective view of a utility cart constructed according to my invention;

FIGURE 2 is a horizontal section taken on the line 2—2 of FIGURE 1 looking upwardly as indicated by the arrows thereon;

FIGURE 3 is a horizontal section taken on the line 3—3 of FIGURE 1 looking downward as indicated by the arrows thereon;

FIGURE 4 is a transverse section taken on the line 4—4 of FIGURE 1;

FIGURE 5 is an enlarged detail section showing the manner in which the axle and wheels are mounted on the cart;

FIGURE 6 is an enlarged detail section taken on the line 6—6 of FIGURE 1;

FIGURE 7 is an enlarged detail section taken on the line 7—7 of FIGURE 1; and

FIGURE 8 is an enlarged detail sectional view similar to FIGURE 6 showing a modified connecting means between the two U-shaped elements comprising the rectangular frame.

The construction of the cart will now be described in detail in connection with the drawing with the use of reference numerals. Thus the cart is constructed of a plurality of pairs of similar preformed elements all of which are preferably formed from the same diameter hollow tubing, and are detachably connected together.

The cart comprises a pair of vertically disposed transversely spaced similar side frames, generally indicated by the numerals 1 and 2, each of which comprises an upwardly extending, forwardly inclined arm 3 and a spaced upwardly extending, rearwardly inclined arm 4 having the lower ends thereof connected together by a longitudinally extending connecting member generally indicated by the numeral 5. The connecting member 5 is formed with a pair of downwardly extending bends or rounded protuberances 6 and 7, which are connected together by an upwardly extending reverse bend or hump 8. The bends 7 which are of greater depth than the bends 6 constitute supporting legs for the rear end of the cart and terminate in the rearwardly inclined upwardly extending arms 4. The bends 6 terminate in the forwardly inclined, upwardly extending arms 3.

A pair of similar extension members 9 are provided, one of which is detachably secured to the upper end of each of the arms 4. Each of the extension members 9 comprises an elongated straight section 10 which constitutes a linear prolongation of an arm 4. The upper end of the section 10 terminates in an angularly disposed, rearwardly extending handle portion or member 11, and the lower end thereof is provided with an integral socket or sleeve 12 into which the upper end of an arm 4 is inserted. The arms 4 and the members 9 are rigidly secured together by bolts 13 which extend through aligned apertures in the arms 4 and sleeves 11. The handle members 11 are preferably provided with a pair of rubber hand grips 14.

A horizontally disposed rectangular frame, generally indicated by the numeral 15 is detachably connected at one end thereof to the upper ends of the forwardly inclined arms 3 and at the other end thereof to the extensions 10 of the rearwardly inclined arms 4 by bolts 16. The rectangular frame 15 is made up of two opposed, similar U-shaped elements, each of which consists of a pair of spaced parallel side portions 17 and 17a connected together by an end portion 18. The free end of each side portion 17 of the U-shaped members is enlarged to provide a socket 19, the internal diameter of which is the same as the external diameter of the free ends of the side portions 17a. The U-shaped members are rigidly detachably connected together with the free ends of the side portions 17a disposed within the sockets 19, by bolts 21 which are inserted through diametrically opposed elongated slots 20 in the sockets 19 and aligned apertures adjacent the free ends of the side portions 17a. The bolts 21 also connect the cross braces 33 to the upper frame 15 as described hereinafter. The provision of the elongated slots 20 in the sockets 19 instead of diametrically opposed circular apertures such as are provided adjacent the free ends of the side portions 17a facilitates the bolting of the U-shaped elements together in the event that the apertures in the side portions did not accurately align with similar apertures in the sockets 19 when the free ends of the side portions 17a were inserted into the sockets 19.

The curved junctions of the side members 17 and 17a with the connecting end portions 18 are provided with concave depressions 18a as shown in FIGURES 1 and 2. The bolts 16 by which the rectangular frame 15 is secured to the side frames 5, extend through complementary aligned apertures in the depressions 18a and the upwardly extending arms of the side frames with the heads of the bolts 16 disposed within the concave depressions where they are not likely to be engaged by anything disposed in the cart.

A utensil supporting base, generally indicated by the numeral 22, is detachably secured to and between the side frames 1 and 2 parallel to the rectangular frame 15 at the apex of the upwardly extending bends 8. The base 22 consists of two similar zig-zag or W-shaped members 23, each of which comprises two contiguous V-shaped sections 24 which are connected together by a flattened section 25. The vertices of the V-shaped sections 24 are flattened as indicated at 26, and the free ends thereof are flattened as indicated at 27 and 28. The members 23 are rigidly connected together back-to-back at the flattened vertices 26 of the V-shaped sections 24 by bolts 29. The flattened free ends 27 of the W-shaped members 23 are detachably connected to the forwardly inclined arms 3 by bolts 30, and the flattened free ends 28 thereof are detachably connected to the rearwardly extending arms 4 by the bolts 13 which also secure the upper ends of the arms 4 in the sockets 12. The flattened, intermediate connecting sections 25 between the contiguous V-shaped sections 24 are detachably connected to the upwardly extending bends 8 at the apices thereof by bolts 31.

A medial transversely disposed dividing and rigidifying X-shaped frame, generally indicated by the numeral 32 is removably secured between the rectangular frame 15 and the utensil or container supporting base 22. The frame 32 comprises a pair of similar straight bars 33 having flattened mid-sections 34. One end of each of the bars 33 is flattened and formed into an arcuate section 35, and the other end thereof is flattened and bent at an angle to the bar as indicated at 36. One of the bars 33 is diagonally removably secured between the back side of the rectangular frame 15 and the bend 8 of the front side frame 1; and the other bar 33 is diagonally removably secured, in the opposite direction, between the front side of the rectangular frame 15 and the bend 8 of the back side frame 2. The flattened arcuate ends 35 of the bars 33 are detachably secured to the sides of the rectangular 15 by the bolts 21 with which the U-shaped members are connected together; and the flattened angularly disposed ends 36 thereof are detachably connected to and between the bends 8, of the side frames 1 and 2, and the flattened connecting sections 25 between the V-shaped contiguous sections 24 of the zig-zag or W-shaped members 23 by the bolts 31 with which the utensil supporting base 22 is secured to the bends 8. The crossing flattened mid-sections 34 are secured together by a bolt 37.

An elongated bolt 38, which constitutes an axle, is removably inserted through aligned apertures 39 disposed in the apices of the bends 6 of the side frames 1 and 2. A pair of wheels 40 which are preferably rubber tired as shown at 41, are rotatably mounted on the bolt or axle 38 outwardly of the side frames 1 and 2.

A slightly modified manner of connecting the opposing free ends of the side members 17 and 17a together is shown in FIGURE 8. In this form of connecting means the sockets 19 of the side portions 17 are eliminated and dowel pins 171 are substituted therefor. The dowel pins 171 are secured within the ends of the side portions 17 by rivets 172 and extend outwardly therefrom into the ends of the side portions 17a. The V-shaped elements are rigidly and detachably secured together by the bolts 21 which are inserted through complementary aligned apertures in the side portions 17a and the dowel pins 171. The arcuate ends 35 of the diagonal brace member 33 are disposed about the abutting ends of the side members 17 and 17a and are also secured in place by the bolts 21.

From the foregoing it will be apparent that I have provided a utility cart of the character described, which is light in weight, is strong and durable, and is inexpensive to manufacture; and it is to be understood that I am not limited to the specific construction shown and described herein as various modifications may be made therein within the spirit of the invention and the scope of the appended claim.

What is claimed is:

A utility cart of the character described, which is made up of a plurality of pairs of similar preformed tubular elements which are adapted to be detachably assembled together, and which comprises: a pair of similar vertically disposed transversely spaced side frames, each of which comprises a forwardly inclined upwardly extending arm and a rearwardly inclined upwardly extending arm having the lower ends thereof connected together by a longitudinally extending connecting member which comprises a pair of spaced concave downwardly extending bends which are connected together by an intermediate convex upwardly extending bend on one of said downwardly extending bends which is of greater depth than the other of said downwardly extending bends constituting supporting legs and terminating in said rearwardly inclined upwardly extending arms and the other of said downwardly extending bends terminating in said forwardly inclined upwardly extending arms; a pair of wheels which are disposed outwardly of said side frames and are rotatably mounted upon an axle which is removably secured to and between the said other of said downwardly extending bends; a pair of similar handle members which are detachably connected to and constitute linear extensions of said rearwardly inclined upwardly extending arms and terminate in rearwardly extending hand grips; a horizontally disposed rectangular frame having the forward end thereof detachably secured to said forwardly inclined upwardly extending arms adjacent the upper ends thereof and the rear end thereof detachably secured to said handle members, said rectangular frame comprising a pair of opposed similar U-shaped members having the opposed open ends thereof detachably secured together; a utensil supporting frame which is disposed below the said rectangular frame parallel thereto and which comprises a pair of similar zig-zag members each of which comprises a pair of contiguous V-shaped sections which are connected together by a flattened intermediate section, said zig-zag members being connected together back-to-back at the vertices of said V-shaped sections and one of the free ends of said zig-zag members being detachably connected to the said forwardly inclined upwardly extending arms and the other free ends of said zig-zag sections being detachably connected to said rearwardly inclined upwardly extending arms at the junction thereof with said handle members, and the said flattened intermediate sections being detachably connected to the apices of said intermediate upwardly extending bends; and a medially disposed transverse dividing and rigidifying X-frame which comprises a pair of similar elongated lineal members, the upper ends of which are detachably connected to the sides of said rectangular frame at the junction of the opposing ends of the U-shaped sections thereof and the lower ends of which are detachably connected to the apices of said intermediate upwardly extending bends and to the flattened intermediate sections of said zig-zag members, the said elongated linear members of said X-frame being connected together at the medial overlapping points thereof; the upper ends of said rearwardly inclined upwardly extending arms, the lower ends of said handle members and one of the free ends of said zig-zag members being all connected together by a single bolt which is inserted through aligned apertures in the said arms and members; the opposing ends of the said U-shaped members of said rectangular frame and the upper ends of the elongated linear members of said medial X-frame being all connected together by a single bolt which is inserted through aligned apertures in the said members; and the lower ends of said elongated linear member of said X-frame and the flattened intermediate connecting sections of said zig-zag members being connected together and to the apices of the intermediate upwardly extending bends by a single bolt which is inserted through aligned apertures therein.

References Cited in the file of this patent

UNITED STATES PATENTS

| | | |
|---|---|---|
| D. 182,298 | McGrath | Mar. 11, 1958 |
| 851,068 | Cowell | Apr. 23, 1907 |
| 2,419,422 | Schulein | Apr. 22, 1947 |
| 2,578,440 | Meyer | Dec. 11, 1951 |
| 2,809,847 | Sperlich | Oct. 15, 1957 |
| 2,843,393 | Dahlander | July 15, 1958 |
| 2,855,210 | Joyce | Oct. 7, 1958 |
| 3,046,035 | Nichols | July 24, 1962 |